United States Patent Office

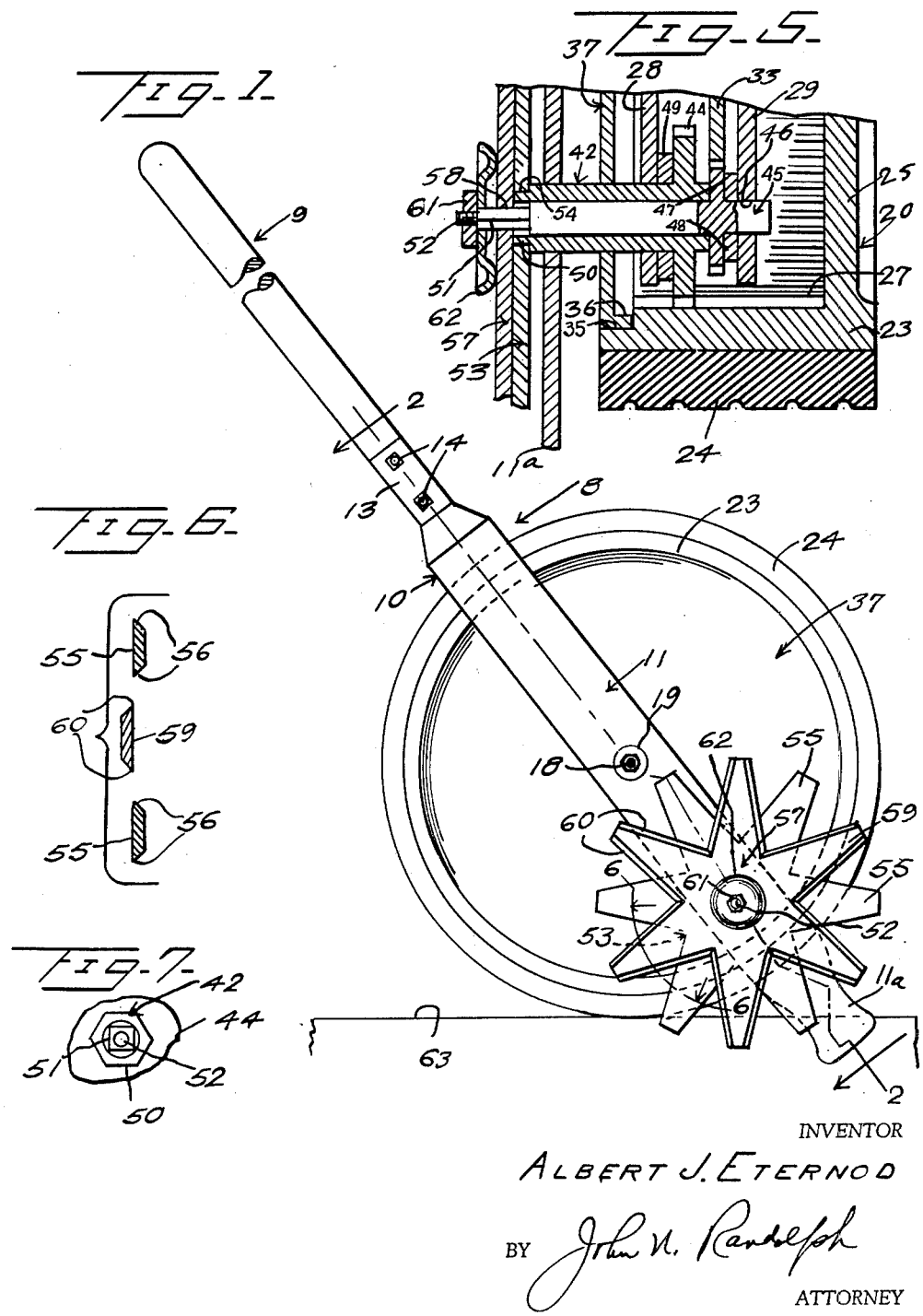

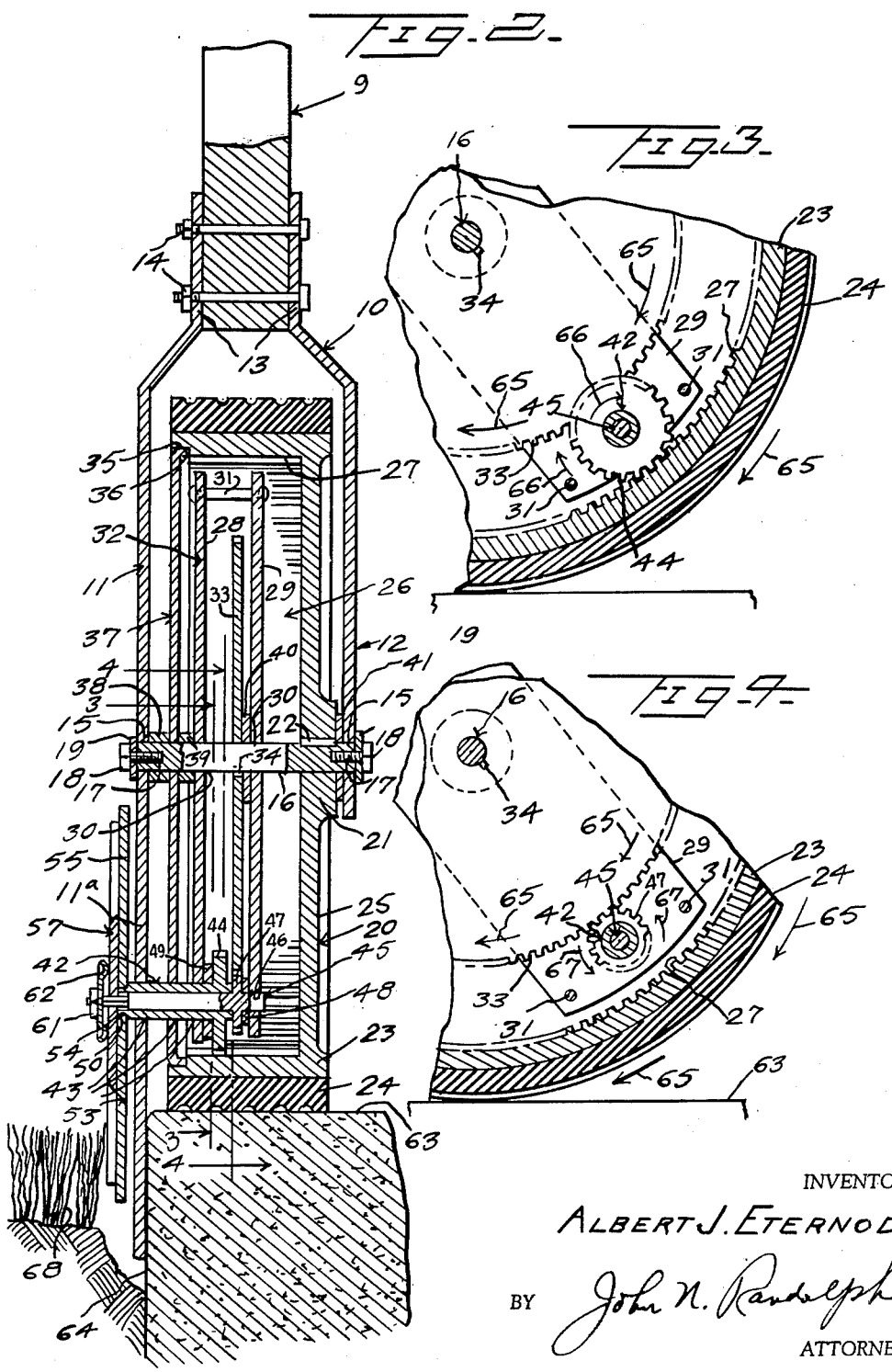

3,168,801
Patented Feb. 9, 1965

3,168,801
LAWN EDGE TRIMMER
Albert J. Eternod, 1618 Nero St., Metairie, La.
Filed Oct. 26, 1962, Ser. No. 233,354
1 Claim. (Cl. 56—256)

This invention relates to an implement for use in trimming lawn edges, particularly edges of lawns adjoining sidewalks or the like.

It is a primary object of the present invention to provide a lawn edge trimmer which may be pushed or pulled in either direction along any edge of a sidewalk or the like for trimming the grass adjoining said sidewalk edge.

Another object of the invention is to provide an implement including a traction driving wheel and rotary cutting blades which are driven in opposite directions thereby and at an increased r.p.m. relative to the r.p.m. of the traction wheel for insuring an effective cutting and trimming of all of the grass along a sidewalk edge or along other borders adjacent which the implement is operated.

A further object of the invention is to provide an implement of the aforedescribed character including a part forming a guide for the traction wheel and a deflector for deflecting grass upwardly therefrom and into the path of the cutting blades.

Still another object of the invention is to provide an implement of extremely simple construction which may be operated efficiently and with a minimum of manual effort by an unskilled operator and yet effectively accomplish the intended cutting operation thereof.

Various other objects and advantages of the invention will hereinafter become more fully apparent from the following description of the drawings, illustrating a presently preferred embodiment thereof, and wherein:

FIGURE 1 is a fragmentary side elevational view showing the lawn edge trimmer in an operative position;

FIGURE 2 is an enlarged fragmentary sectional view thereof, taken substantially along the line 2—2 of FIGURE 1;

FIGURES 3 and 4 are sectional views taken substantially along the lines 3—3 and 4—4, respectively, of FIGURE 2;

FIGURE 5 is an enlarged fragmentary substantially radial sectional view showing a part of the structure as illustrated in FIGURE 2 but on an enlarged scale;

FIGURE 6 is a detailed sectional view taken substantially along the line 6—6 of FIGURE 1, and FIGURE 7 is a fragmentary end elevational view illustrating certain of the parts of the implement.

Referring more specifically to the drawings, the lawn edge trimmer in its entirety is designated generally 8 and includes an elongated handle 9 and a fork, designated generally 10, which is secured to and projects from an inner or lower end of the handle 9, and which is composed of fork arms 11 and 12, complementary inwardly offset ends 13 of which straddle the inner handle end and are secured thereto by nut and bolt fastenings 14. The fork arm 12 is provided near its other end wtih a journal opening 15 and the fork arm 11 has a corresponding journal opening 15 which aligns with the opening 15 of the arm 12 and in which openings portions of an axle 16 are journaled. The axle 16 extends between the fork arms and has threaded sockets 17 opening outwardly of the ends thereof to receive the threaded shanks of headed screws 18, and a washer 19 is mounted on each screw 18 between the head thereof and the adjacent end of the axle 16, and said washers bear against the outer sides of the fork arms 11 and 12.

A traction wheel, designated generally 20, is supported on the axle 16 for rotation in the fork 10 and includes a hub 21 which is keyed to the axle by a key 22. The wheel 20 includes a rim 23 on the periphery of which is mounted a rubber tire 24 which may be provided with a suitable traction tread. The wheel 20 includes a disc 25 extending between the hub 21 and rim 23 and which merges with the rim adjacent one side edge thereof, so that the hub 21 and disc 25 are disposed adjacent the fork arm 12, and combine with the rim 23 to define a chamber 26 within said wheel 20 and which opens outwardly of the other side thereof toward the fork arm 11. The internal surface of the rim 23 is toothed to provide a ring gear 27.

A pair of elongated plates 28 and 29 are journaled intermediate of their ends on the axle 16 by means of aligned openings 30 thereof through which said axle extends. The plates 28 and 29 are of substantially uniform width from end-to-end thereof and are connected to one another adjacent their ends by rivet type fasteners 31, by means of which said plates are held in spaced apart substantially parallel relation to one another to define a gear housing, designated generally 32, which is disposed in the wheel chamber or cavity 26. A gear 33 is secured on the axle 16 by a key 34 and is disposed within the gear housing 32.

The rim 23 has an annular recess 35 in the side edge thereof disposed remote from the wheel disc 25 and at the open side of the cavity 26, which receives the peripheral edge 36 of a disc shaped shield 37 which closes said open side of the cavity 26. The shield 37 is mounted on the axle 16. A spacing element 38 is disposed on the axle 16 between the shield 37 and fork arm 11 and another spacing element 39 is disposed on the axle between the shield 37 and the plate 28. Preferably, a spacing washer 40 is disposed on the axle 16 between the plate 29 and gear 33 and a spacing washer 41 is disposed on said axle between the hub 21 and fork arm 12.

The fork arm 12 terminates just beyond the axle 16 while the fork arm 11 is extended to beyond the peripheral portion of the wheel 20 which is located remote from the handle 9. A hollow shaft 42 extends through and is journaled in aligned openings 43 of the plate 28, shield 37 and the extended portion 11a of the fork arm 11. The hollow shaft 42 near an inner end thereof is provided with a spur gear 44 which is disposed in and projects from an end of the gear housing 32 and which meshes with the ring gear 27. A shaft 45 extends through and is journaled in the hollow shaft 42 and has an inner end which is journaled in an opening 46 of the plate 29. The shaft 45 is provided with a spur gear 47 which meshes with the gear 33 and which is disposed in the gear housing 32 between the inner end of the shaft 42 and the plate 29. A spacing washer 48 is mounted on the shaft 45 between the gear 47 and plate 29 to hold the gear 47 against the inner end of the shaft 42 and coplanar with the gear 33. A spacing washer 49 is mounted on the hollow shaft 42 between the spur gear 44 and the plate 28 and combines with the spur gears and washer 38 to prevent sliding movement of the gear housing 32 on the axle 16.

The hollow shaft 42 has a hexagon shaped outer end 50, as best seen in FIGURE 7, which is spaced outwardly from the fork arm portion 11a, and the shaft 45 has a restricted stem portion 51 which is preferably square in cross section which extends outwardly from the portion 50 and from which projects a further restricted threaded stem 52, as best seen in FIGURE 5.

A circular cutting blade 53 has a hexagon shaped central opening 54 which engages nonturnably on the portion 50. The blade 53 has radial projecting cutting fingers 55 which are provided with outwardly converging side edges 56 which are beveled and sharpened on the side thereof which faces the arm portion 11a, as seen in FIGURE 6. A circular cutting blade 57 has a square central opening 58 which fits nonturnably on the stem 51. The blade 57 has radially extending tapered fingers 59, corresponding to the fingers 55 and having sharpened edges 60 which are beveled on the sides thereof which face away from the blade 53, as seen in FIGURES 1 and 6. A nut 61 threadedly engages the outer end of the stem 52 and a spring washer 62 is mounted on said stem between the nut 61 and blade 57 for holding the blade 57 yieldably against the blade 53.

In operating the lawn edge trimmer 8, the handle 9 is grasped and held at an incline upwardly relative to the wheel 20, as seen in FIGURE 1. The wheel is positioned on the upper surface of a sidewalk or the like 63 and so that the lower extremity of the arm portion 11a will engage against an edge 64 of the sidewalk, as seen in FIGURES 1 and 2. The implement 8 is normally operated by being pushed, in a direction from left to right of FIGURE 1. When thus operated, the ring gear 27 and the gear 33 will both turn clockwise as indicated by the arrows 65 in FIGURES 3 and 4, and the spur gear 44 will also turn clockwise, as indicated by the arrows 66 in FIGURE 3, while the spur gear 47 will revolve counterclockwise, as indicated by the arrows 67 in FIGURE 4. Thus, the shafts 42 and 45 and the cutting blades 53 and 57, respectively, connected thereto, will revolve in opposite directions. In addition, said spur gears, shafts and cutting blades will be driven approximately twelve revolutions for each revolution of the wheel 20, so that the cutting fingers 55 and 59 of the rapidly revolving cutting blades 53 and 57, respectively, will effectively cut and trim all of the grass or other growth 68 adjoining and overhanging the sidewalk edge 64. In addition, the arm portion 11a which engages the sidewalk edge 64 will further function as a deflector for deflecting the grass and other growth 68 upwardly and toward the oppositely rotating fingers 55 and 59. Said fingers 55 and 59 in rotating in opposite directions to one another will execute shearing cuts and the cutting edges thereof will be self-sharpened by the blades being pressed against one another. The rubber tire 24 will prevent slippage of the wheel 20 on the sidewalk 63 to insure rotation of the cutting blades at a proper speed in relation to the speed of translational movement of the implement 8. It will also be apparent that the implement could be pulled from right to left and with the blades operating in the aforedescribed manner and turning in opposite directions. The handle 9 may also be inclined upwardly and to the right, rather than upwardly and to the left, as seen in FIGURE 1, for pushing the implement 8 in the opposite direction, or from right to left of FIGURE 1, as when being used by a left handed person or in approaching an end of a sidewalk edge toward which the implement is moving.

Various modifications and changes are contemplated and may be resorted to, without departing from the function or scope of the invention as hereinafter defined by the appended claim.

I claim as my invention:

A lawn edge trimmer comprising a handle having a fork at one end thereof, a traction wheel journaled in said fork, a hollow shaft journaled in one arm of the fork, a second shaft extending through and journaled in said hollow shaft, gearing connecting the hollow shaft and second shaft to the traction wheel for rotation of said shafts in opposite directions relative to one another when the traction wheel is revolved, a circular cutting blade fixed to said hollow shaft and disposed on the outer side of said fork arm, and a second circular cutting blade fixed to said second shaft and disposed on the outer side of said first mentioned cutting blade, said fork arm extending to beyond the peripheries of said blades and traction wheel to provide a wheel guide and grass deflector.

References Cited in the file of this patent

UNITED STATES PATENTS

| | | |
|---|---|---|
| 1,970,827 | Van Kesteren | Aug. 21, 1934 |
| 2,496,327 | Beck | Feb. 7, 1950 |
| 2,496,377 | Cochran | Feb. 7, 1950 |
| 2,512,132 | Ayers | June 20, 1950 |
| 2,973,616 | Richard | Mar. 7, 1961 |